Patented Mar. 3, 1942

2,274,864

UNITED STATES PATENT OFFICE 2,274,864

POLYMERIZATION PRODUCT AND METHOD OF PREPARING AND USING SAME

Eugene Lieber, Staten Island, and Marvin E. Thorner, Brooklyn, N. Y., assignors to Standard Oil Development Company, a corporation of Delaware No Drawing. Application June 29, 1940, Serial No. 343,152

14 Claims. (Cl. 252—59)

This invention relates to a novel type of polymerization products and to methods of preparing such products and using them, more particularly for using them as pour depressors in waxy lubricating oils.

Contrary to the prior art, it has now been found that effective pour depressors for waxy oils can be prepared by the polymerization of low molecular weight alcohols containing less than 8 carbon atoms, by means of catalysts of the Friedel-Crafts type.

The alcohols to be used include the lower saturated aliphatic alcohols of 7 carbon atoms and less, of which the following are typical examples: methyl alcohol, ethyl alcohol, normal propyl alcohol, isopropyl alcohol, the butyl alcohols, such as normal butyl alcohol, isobutyl alcohol, secondary butyl alcohol, the amyl alcohols, such as n-butyl carbinol, sec-butyl carbinol, dimethyl ethyl carbinol, methyl propyl carbinol and the hexyl alcohols. These may be used singly or in combination. In particular we have found the mixed amyl alcohols of commerce to be particularly useful. Other mixed alcohols may be used, such as those obtained, for instance, by hydration of a mixture of normally gaseous olefins, e. g. as obtained in the gaseous products formed during the cracking of heavier normally liquid petroleum fractions of the kerosene, gas oil or lubricating oil boiling range. In addition to the saturated aliphatic alcohols, one can also use unsaturated aliphatic alcohols having less than 8 carbon atoms such as allyl alcohol and furyl alcohol as well as cyclo aliphatic alcohols such as cyclo hexanol and methyl-cyclohexanol.

The catalysts which are to be used to effect the polymerization of the above-described alcohols should be of several types, although those of the Friedel-Crafts type are especially preferred, such as aluminum chloride, ferric chloride, zinc chloride, antimony chloride, antimony fluoride, stannic fluoride, boron fluoride and others. Of these, aluminum chloride is preferred. Other types of catalysts may be used such as sulfuric acid, hydrogen fluoride, activated clays, silica gel, metallic zinc, aluminum, etc., although these types are not as effective as those of the Friedel-Crafts type.

In effecting the polymerization, it is desired, although not essential, to use an inert solvent or diluent such as a refined kerosene (heavily pretreated with sulfuric acid before using), or ethylene dichloride, tetrachlorethene, etc. The amount of diluents may be from about ½ volume to 5 volumes, for each volume of the low molecular weight alcohol to be polymerized.

The amount of catalyst to be used may vary widely according to the temperature to be used, the desired speed of reaction and the degree of polymerization desired, but ordinarily it will range from about 10% to about 100% by weight of the low molecular weight alcohol starting material.

In carrying out the invention, the aluminum chloride or other catalyst to be used may be suspended in the solvent or diluent and then the low molecular weight alcohol to be used is gradually added with stirring, and with cooling if the reaction is very vigorous, so as to prevent the temperature of the reaction mixture from rising above about 200° F. As the reaction subsides, it may be desirable to actually heat the reaction mass to a temperature between about 150° F. to 200° F. for a period of ½ to 10 hours, usually about 1 to 5 hours being sufficient, in order to insure completion of the desired polymerization reaction. At the end of the reaction, the mixture is cooled, e. g. to about 100° F., and diluted with one or two volumes of refined kerosene and then the aluminum chloride or other catalyst is decomposed by the slow addition of water. After settling, the water layer containing the decomposed aluminous sludge is drawn off and discarded. The kerosene extract may, if desired, be further washed with water, and is then distilled with fire and steam to about 600° F. in order to remove the solvent and low boiling products. The bottoms residue constitutes the desired pour depressor products.

This polymerization product is soluble in mineral lubricating oils and has the property of depressing the pour point of waxy mineral lubricating oils when added thereto in small amounts, for instance, about 0.1% to 10.0% although usually the amount to be used ranges between about 0.5% and 5.0%. This polymerization product is also useful as a wax modifier for other purposes such as for use as a dewaxing aid for reducing the wax content of waxy oils. This polymerization product may also be used to modify the crystal structure of paraffine wax or various compositions containing large amounts of same, to be used for various purposes such as for coating or impregnating paper, etc. or for making various molded wax products.

The invention will be better understood from a consideration of the following experimental data:

| Test No. | Aliphatic alcohol | | Solvent | | AlCl (gm.) | Temp., °F. | Hrs. | Yield (gm.) | Product | |
|---|---|---|---|---|---|---|---|---|---|---|
| | Name | Ccs. | Kind | Ccs. | | | | | Nature | Pour point (°F.)* $\frac{\% \text{ product added}}{2}$ |
| 1 | Mixed amyl alcohol | 500 | Ethylene dichloride | 200 | 300 | 175 | 3 | 66 | Visc. dark green oil | −15 |
| 2 | do | 500 | Refined kerosene | 200 | 300 | 230 | 2 | 102 | do | 0 |
| 3 | do | 500 | Tetrachlorethane | 200 | 300 | 200 | 3 | 78 | do | −20 |
| 4 | Sec. amyl alcohol | 400 | do | 200 | 300 | 200 | 3 | 65 | do | −5 |
| 5 | Cyclohexanol | 500 | do | 200 | 300 | 200 | 3 | 52 | Green resin | −5 |
| 6 | Mixed amyl alcohol | 500 | Refined kerosene | 200 | 300 | 200 | 3 | 53 | Visc. dark green oil | −15 |

*Original oil, pour point +30° F.

In the above tests, anhydrous aluminum chloride was used. It should also be noted that in the distillation of the polymerization product it was found that a fraction of the polymerization product distilling overhead in the range of 500° F. to 600° F. could be recycled with a further quantity of aluminum chloride to give more of the desired high-boiling alcohol polymers which are useful for depressing the pour point of waxy lubricating oils.

The waxy lubricating oil having an original pour point of +30, used in the above tests was a blend of 10 volumes of bright stock and 90 parts of Manchester spindle oil.

During the above described reaction, a vigorous evolution of hydrogen chloride gas took place, thus indicating that at least a portion of the chlorine content of the aluminum chloride catalyst was taking part in the reaction.

It is not intended that this invention be limited to any of the specific examples which were given merely for the sake of illustration, nor to any theory as to the mechanism of the operation of the invention, but only by the appended claims in which it is intended to claim all novelty inherent in the invention as broadly as the prior art permits.

We claim:

1. A composition comprising a polymerization product of a low molecular weight monohydric alcohol, such polymerization product being substantially non-volatile at about 600° F.

2. A product consisting essentially of a polymerization product of an aliphatic monohydric alcohol having less than 8 carbon atoms, said polymerization product being substantially non-volatile at about 600° F.

3. A polymerization product of an amyl alcohol, said product being substantially non-volatile at about 600° F.

4. A product obtained by polymerizing a saturated monohydric alcohol having less than 8 carbon atoms in the presence of a Friedel-Crafts catalyst at a temperature ranging from about room temperature to about 200° F., said polymerization product being substantially non-volatile at about 600° F., and having the property of depressing the pour point of waxy mineral oils when added thereto in small amounts.

5. A polymerization product of cyclohexanol, being substantially non-volatile at about 600° F.

6. A process which comprises polymerizing a low molecular weight monohydric alcohol in the presence of a Friedel-Crafts catalyst to obtain a polymerization product which is substantially non-volatile at about 600° F. and has the property of depressing the pour point of waxy mineral lubricating oils when added thereto in small amounts.

7. Process according to claim 6 in which the alcohol used is a saturated aliphatic alcohol having less than 8 carbon atoms.

8. Process according to claim 6 in which a cyclo aliphatic alcohol having less than 8 carbon atoms is used.

9. The process which comprises polymerizing a low molecular weight saturated aliphatic monohydric alcohol having less than 8 carbon atoms in the presence of anhydrous aluminum chloride at a temperature between the approximate limits of room temperature and about 200° F. for a reaction time sufficient to produce a polymerization product which is substantially non-volatile at about 600° F., but not for a sufficient duration to produce solid rubbery products which are insoluble in mineral oils.

10. The process which comprises polymerizing an amyl alcohol in the presence of aluminum chloride and in the presence of an inert solvent, at a temperature between the approximate limits of room temperature and about 200° F., to produce a polymerization product having the property of depressing the pour point of waxy mineral lubricating oils when added thereto in small amounts.

11. A lubricating composition comprising a lubricating oil base stock and a small amount of a polymerization product of a low molecular weight monohydric alcohol having less than 8 carbon atoms, said polymerization product being substantially non-volatile at about 600° F.

12. A lubricating composition comprising a major proportion of a waxy mineral lubricating oil and a small amount of the polymerization product described in claim 2.

13. A lubricant comprising a major proportion of a waxy mineral lubricating oil and about 0.1% to 10.0% of a polymerization product of a saturated aliphatic monohydric alcohol having less than 7 carbon atoms obtained by polymerizing such alcohol in the presence of a Friedel-Crafts type catalyst at a temperature between the approximate limits of room temperature and about 200° F., the said polymerization products being substantially non-volatile at about 600° F. and having the property of depressing the pour point of the waxy lubricating oil in which it is incorporated.

14. A lubricant comprising a lubricating oil base stock and a polymerization product of amyl alcohol, said polymerization product serving as pour depressor.

EUGENE LIEBER.
MARVIN E. THORNER.